United States Patent
Yang

(10) Patent No.: US 8,052,525 B2
(45) Date of Patent: Nov. 8, 2011

(54) SYSTEM FOR PROTECTING ON-LINE FLASH GAME, WEB SERVER, METHOD FOR PROVIDING WEBPAGE, AND STORAGE MEDIA RECORDING THAT METHOD EXECUTION PROGRAM

(75) Inventor: Zoo Il Yang, Seoul (KR)

(73) Assignee: NHN Corporation, Seongnam-si (KR)

( * ) Notice: Subject to any disclaimer, the term of this patent is extended or adjusted under 35 U.S.C. 154(b) by 1402 days.

(21) Appl. No.: 11/508,389

(22) Filed: Aug. 22, 2006

(65) Prior Publication Data
US 2007/0049371 A1    Mar. 1, 2007

(30) Foreign Application Priority Data
Aug. 23, 2005    (KR) .................. 10-2005-0077439

(51) Int. Cl.
*A63F 9/24*    (2006.01)
(52) U.S. Cl. ......................................... 463/29
(58) Field of Classification Search ........................ None
See application file for complete search history.

(56) References Cited

OTHER PUBLICATIONS

Zerbes, Mark, Flash Games—A History, May 7, 2011, http://www.esemeleketek.co.cc/2011/05/flash-games-history.html.*
Flash Hacks 100 Industrial-Strength Tips & Tools, O'reilly Japan, Inc., Jul. 1, 2007, First Volume, p. 473-480, 488-494, ISBN: 4-87311-235-4 & its English Abstract in 20 pages.

* cited by examiner

*Primary Examiner* — Corbett B Coburn
(74) *Attorney, Agent, or Firm* — H.C. Park & Associates, PLC

(57) ABSTRACT

Disclosed is a system for providing and protecting online FLASH games, the system including: a game view module configured to provide a FLASH game view for realizing game content as a FLASH application on a game screen displayed on a user terminal; and a game skin module configured to provide a FLASH game skin comprising a frame of FLASH game content, wherein the game skin module is configured to operate in response to, at least in part, selecting performance of a predetermined FLASH game through a web server, and configured to control the game view module to perform the FLASH game content by referring to pre-stored FLASH game execution information based at least in part on a game ID of the selected FLASH game, so that the game view FLASH source information is provided from the FLASH game execution information.

6 Claims, 4 Drawing Sheets

SYSTEM FOR PROTECTING ON-LINE FLASH GAME, WEB SERVER, METHOD FOR PROVIDING WEBPAGE, AND STORAGE MEDIA RECORDING THAT METHOD EXECUTION PROGRAM

CROSS-REFERENCE TO RELATED APPLICATION

This application claims priority from Korean Patent Application No. 10-2005-0077439, filed on Aug. 23, 2005, in the Korean Intellectual Property Office, the entire disclosure of which is incorporated herein by reference.

BACKGROUND OF THE INVENTION (a) Field of the Invention

The present invention relates to an online FLASH game protection system, a web server, a web page provision method, an online FLASH game protection method, and a storage medium for recording the method execution program. More particularly, the present invention relates to an online FLASH game protection system including a web server that is accessed by a user terminal for performing a FLASH game and a game server for transmitting and receiving game information to/from the user terminal when playing a FLASH game and providing and protecting FLASH games, a web server, a web page provision method, an online FLASH game protection method, and a storage medium for recording the method execution program.

(b) Description of the Related Art

As the Internet has become widely used, various services have been provided over the Internet. Accordingly, services of various categories, such as Internet-based online game services and various community services, in addition to the mail services in the earlier popularization stage of the Internet, have become available. Particularly, many users use Internet game services, and the market volume of such services has gradually increased. For example, Go-Stop card games with 1:1 competition rules and various FLASH games have been provided through the Internet.

A FLASH game is a computer game generated by using ADOBE FLASH ("FLASH"), which is an Internet moving picture producing software program, and the FLASH game is generated by applying the action script and motion graphics of the FLASH program. The categories of FLASH games range from the elementary and fun ones for children to those for testing personality and mental states. Representative games include sports games such as bowling and baseball, adventure games, puzzle/board games, games for women such as make up games, slide games, picture finding games, and maze games.

FLASH games have been recently provided by Internet game service providers so that they may be used on line, and they are accordingly used by many users. Particularly, some FLASH games are provided without payment as a service policy for corresponding web page visitors.

In this instance, the respective FLASH games are configured to show URL information indicating existence of corresponding files by simply checking source codes of web pages for providing FLASH game services, and the FLASH games can be copied or linked by unknown users without permission, and hence the existing FLASH game service providers or FLASH game producers may meet with a financial loss.

Particularly, some FLASH games are provided without fee for the purpose of increasing the number of visitors to the corresponding web pages, and when a user copies or links a FLASH game and plays the same game on a different web page, the corresponding FLASH game provider may suffer a greater loss.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to prevent online FLASH games from being copied or linked without permission, and to protect the rights of game producers and game service providers.

In one aspect of the present invention, an online FLASH game protection system for providing and protecting FLASH games, wherein the system includes a web server that is accessed by a user terminal so as to perform a FLASH game and a game server for transmitting/receiving game information to/from the user terminal when performing the FLASH game, includes: a game view FLASH module for providing a game view FLASH for realizing game contents as a FLASH on a FLASH game screen displayed on the user terminal; and a game skin FLASH module for providing a game skin FLASH that is a frame to the FLASH-based game contents, the game skin FLASH module being performed when the user selects performance of a predetermined FLASH game through the web server, and controlling the game view FLASH module to perform the FLASH game contents selected by the user by referring to pre-stored FLASH game execution information according to a game ID of the selected FLASH game so that the game view FLASH source information is provided from the FLASH game execution information.

In another aspect of the present invention, an online FLASH game protection method for providing and protecting FLASH games in a system that includes a web server that is accessed by a user terminal so as to perform a FLASH game and a game server for transmitting/receiving game information to/from the user terminal when performing the FLASH game includes: a) when predetermined FLASH game performance is selected, a game skin FLASH module controlling a game skin FLASH that is a frame on a FLASH game screen to be realized on a user terminal screen; b) the game skin FLASH module checking whether a URL of the web page on which the game skin FLASH performance is started is a predetermined URL; and c) when the URL is not a predetermined URL in b), the game skin FLASH module forcibly moving the web page displayed on the user terminal to a web page having a predetermined URL, or terminating realization of the game skin FLASH.

In another aspect of the present invention, an online FLASH game protection method for providing and protecting FLASH games in a system that includes a web server that is accessed by a user terminal so as to perform a FLASH game and a game server for transmitting/receiving game information to/from the user terminal when performing the FLASH game includes: a) selecting performance of a FLASH game in which a game view FLASH that is a game contents FLASH in the FLASH game and a game skin FLASH that is a frame of the game view FLASH are respectively realized by a game view FLASH module and a game skin FLASH module, and realizing a game view FLASH; b) the game view FLASH module checking whether the game skin FLASH is realized;

and c) the game view FLASH module terminating realization of the game view FLASH when no game skin FLASH is realized.

In another aspect of the present invention, an online FLASH game protection method for providing and protecting FLASH games in a system that includes a web server that is accessed by a user terminal so as to perform a FLASH game and a game server for transmitting/receiving game information to/from the user terminal when performing the FLASH game includes: a) selecting performance of a FLASH game in which a game view FLASH that is a game contents FLASH in the FLASH game and a game skin FLASH that is a frame of the game view FLASH are respectively realized by a game view FLASH module and a game skin FLASH module, and realizing a game view FLASH; b) the game view FLASH module checking whether a URL of the web page on which the game view FLASH realization is performed is a predetermined URL; and c) the game view FLASH module terminating game view FLASH realization when the URL is not a predetermined URL in b).

In another aspect of the present invention, a method for providing a web page for performing a FLASH game to a user terminal connected through a network in a system that includes a web server that is accessed by the user terminal so as to perform a FLASH game and a game server for transmitting/receiving game information to/from the user terminal when performing the FLASH game includes: a) the web server providing a web page on which source information of a game skin FLASH that is a frame on a FLASH game screen is recorded, and driving the game skin FLASH on the web page; and b) the game skin FLASH checking game view FLASH source information that is game contents of a FLASH game corresponding to a game ID of the selected FLASH game from pre-stored FLASH game execution information, and realizing the game view FLASH at a predetermined position of the web page.

In another aspect of the present invention, provided is a storage medium for recording a program for controlling the method disclosed by any one of the above-described methods, to be performed in a computer.

In another aspect of the present invention, provided is a web server configuring a network with a game server for transmitting/receiving game information to/from a user terminal and being accessed by the user terminal so as to perform a FLASH game wherein when a predetermined FLASH game performance is selected by the user terminal, the web server includes game skin FLASH source information that is a frame on a FLASH game screen and provides a web page including script that is driven on the web page, and the web server includes FLASH game execution information for storing game view FLASH source information that is game contents in the FLASH game for respective FLASH game IDs so that the game skin FLASH may check corresponding game view FLASH source information from the FLASH game execution information and perform the game view FLASH at a predetermined position of the web page.

DETAILED DESCRIPTION OF THE EMBODIMENTS

Embodiments of the present invention will now be described in detail with reference to the accompanying drawings.

Figure 1:
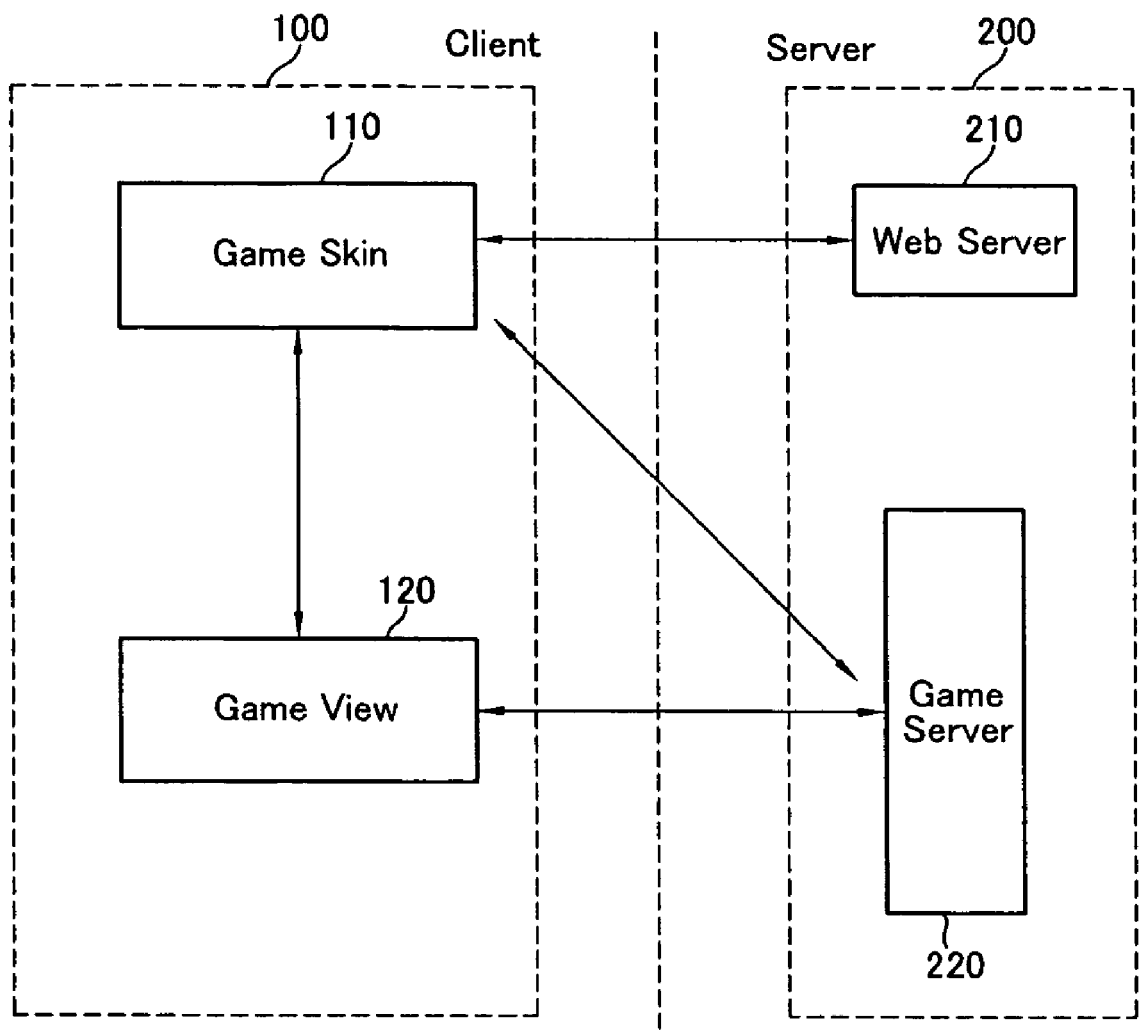
FIG. 1 shows a schematic diagram for performing a FLASH game at a client in an online FLASH game protection system according to an embodiment of the present invention.

As shown in FIG. 1, the online FLASH game protecting system according to the embodiment of the present invention is connected to a user terminal through the Internet, and it includes a web server and a game server.

The use terminal is a communication terminal for accessing the online FLASH game protecting system through the Internet and for performing FLASH games, and for example, a mobile communication terminal, a desktop computer, a portable computer, and other various communication devices are applicable to the user terminal.

In this instance, the game includes a game skin FLASH and a game view FLASH. The game skin FLASH functions as a FLASH game launcher, it is initially performed when the user attempts to perform the FLASH game, and it can perform or terminate the game. The game view FLASH is the substantial game contents in which the user plays a game through a user terminal, and it includes an interface (e.g., a start button when a game is loaded, a game rank provision unit, and an event notice unit) provided to the user on the FLASH game screen.

The game skin FLASH and the game view FLASH will be described in further detail later.

The web server functions as an interface for the user terminal to access the online FLASH game protecting system, converts various pieces of information provided by respective servers into predetermined communication standard data to provide the data to a plurality of user terminals, or receives information from the user terminal through the Internet and provides the information to the respective servers.

The web server provides various and selectable FLASH games to the user terminal through the Internet, and it includes a game skin FLASH module as a game skin FLASH realization file into the user terminal, and FLASH game execution information.

The FLASH game execution information includes a plurality of pieces of FLASH game execution information that can be provided by the online FLASH game providing system, and it can be stored as a CONFIG.XML file. For example, the FLASH game execution information includes a game name of a FLASH game, a game ID, version information, game view FLASH module information realizing game view FLASHes configuring a FLASH game, corresponding server information, and port information.

The web server includes a game skin FLASH module, and it controls the game skin FLASH to be performed on the user terminal and receives a game ID of a specific FLASH game selected by the user when the user selects the FLASH game.

The game skin FLASH module receives game view FLASH module information on the corresponding FLASH game from FLASH game execution information, and controls the game view FLASH to be performed on the user terminal.

The game view FLASH is the substantial game contents in which the user plays the game through the user terminal, and it includes an interface (e.g., a start button when a game is loaded, a game rank provision unit, and an event notice unit)

provided to the user on the FLASH game screen. In this instance, the game view FLASH may include a substantial game contents FLASH and a UI FLASH for realizing an interface with the user.

The game server is a real-time server compared to the general request and answer servers. That is, the game server consecutively checks game results that are transmitted irrespective of the status of requests given by the user terminal having accessed the game server, and transmits/receives information to front the user terminal.

In this instance, the game server includes a game view FLASH module so that the game view FLASH ma be performed on the user terminal by control of the game skin FLASH module, and the game may be played.

Figure 2:
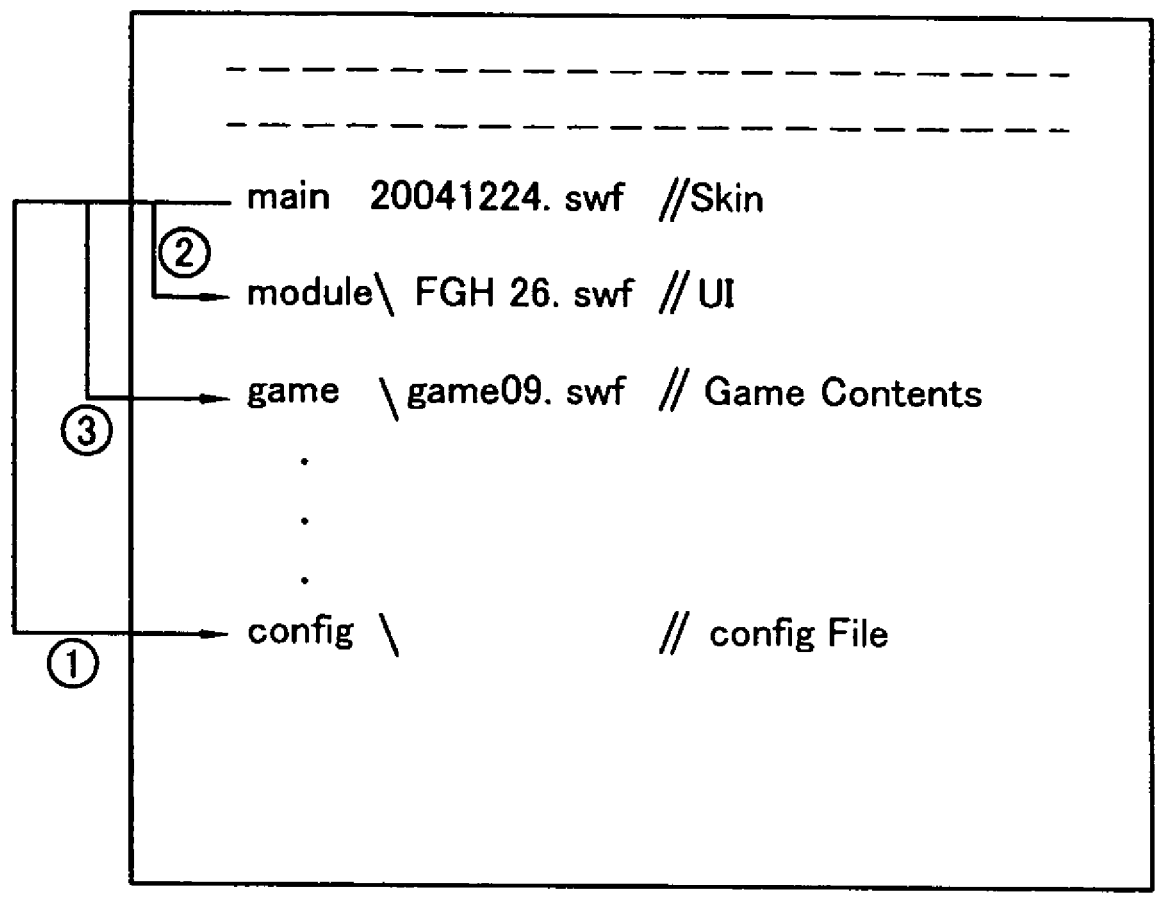
FIG. 2 shows a web page configuration provided by an online FLASH game protection system according to an embodiment of the present invention.

Therefore, as shown in FIG. 2, the FLASH game together with the game skin FLASH and the game view FLASH is displayed on the user terminal screen.

When the user accesses the web server to select execution of a predetermined FLASH game, the web server executes the game skin FLASH on the user terminal including the game skin FLASH module.

The game skin FLASH module controls the game skin FLASH to be loaded on to the user terminal irrespective of the FLASH game type selected by the user. Next, with reference to stored FLASH game execution information, corresponding information is received so as to perform a game view FLASH corresponding to a game ID of the corresponding FLASH game ({circle around (1)}).

For example, based on the game ID, the game skin FLASH module receives URL information including a game view FLASH module, server information for the user terminal to access the server including the game view FLASH module, and port information from the FLASH game execution information.

In this instance, the URL information of the game view FLASH module substantially configuring the game contents is included in the game execution information, is referred to by the game skin FLASH module, and is not directly displayed by the web page source codes providing the FLASH game.

Therefore it is prevented to drain URL information where the FLASH game files exist through the web page source codes, and to randomly set links or download the game files.

Next, as an example, the game skin FLASH module controls the game view FLASH module to be executed based on the information provided from FLASH game execution information such as CONFIG.XML so that the game FLASH may be displayed on the FLASH game screen of the user terminal.

In this instance, the game view FLASH module includes at UI FLASH module and a game contents FLASH module, it is an interface (e.g., a start button when a game is loaded, a game rank provision unit, and an event notice unit) provided to the user on the FLASH game screen, and it is possible to separately perform the UI FLASH and the substantial game contents FLASH.

In this case, the game skin FLASH module per the FLASH module based on the information provided from the FLASH game execution information so that the UI FLASHes including a loading screen and a game start button may be displayed on the FLASH game screen of the UI user terminal ({circle around (2)}).

The game skin FLASH module performs the game contents FLASH module based on the information provided from the FLASH game execution information so as to perform the substantial FLASH game ({circle around (3)}). For example, on receiving a selection signal on the game start button from the user terminal, the game skin FLASH module performs the game contents FLASH module so that the game contents FLASH may be displayed on the user terminal screen.

In this instance, the game skin module performs the game view FLASH module and checks whether the URL of the corresponding web page corresponds to the predefined URL when configuring the web page for performing the FLASH game.

That is, on configuring the web page for substantially performing the FLASH game, the game skin module can terminate the execution of the corresponding game when the address of the web page is changed not by the predefined URL but by an unknown user without any permission. Also, the game skin module can forcibly move the user terminal's screen to a predetermined URL, for example, a web page of a FLASH game service provider.

As a result, it is prevented for the unknown user to transfer the corresponding FLASH game including the game skin module and the game view module without permission, and to perform the FLASH game at a changed web page and not at a predetermined address.

Further, the game view FLASH module checks the existence of the game skin FLASH when the game view FLASH is performed on the user terminal. That is, the game view FLASH module checks whether the game skin FLASH is performed on the web page on which the FLASH game is performed, and can terminate the performance of the game when there is no game skin FLASH.

Further, when there is a game skin FLASH, the game view FLASH module checks whether the web page standing by for game performance corresponds to the predetermined URL, and can terminate performance of the game when the web page does not correspond to the predetermined URL.

Therefore, it is prevented for the users to transfer the substantial game contents except the game skin without permission.

Figure 3:
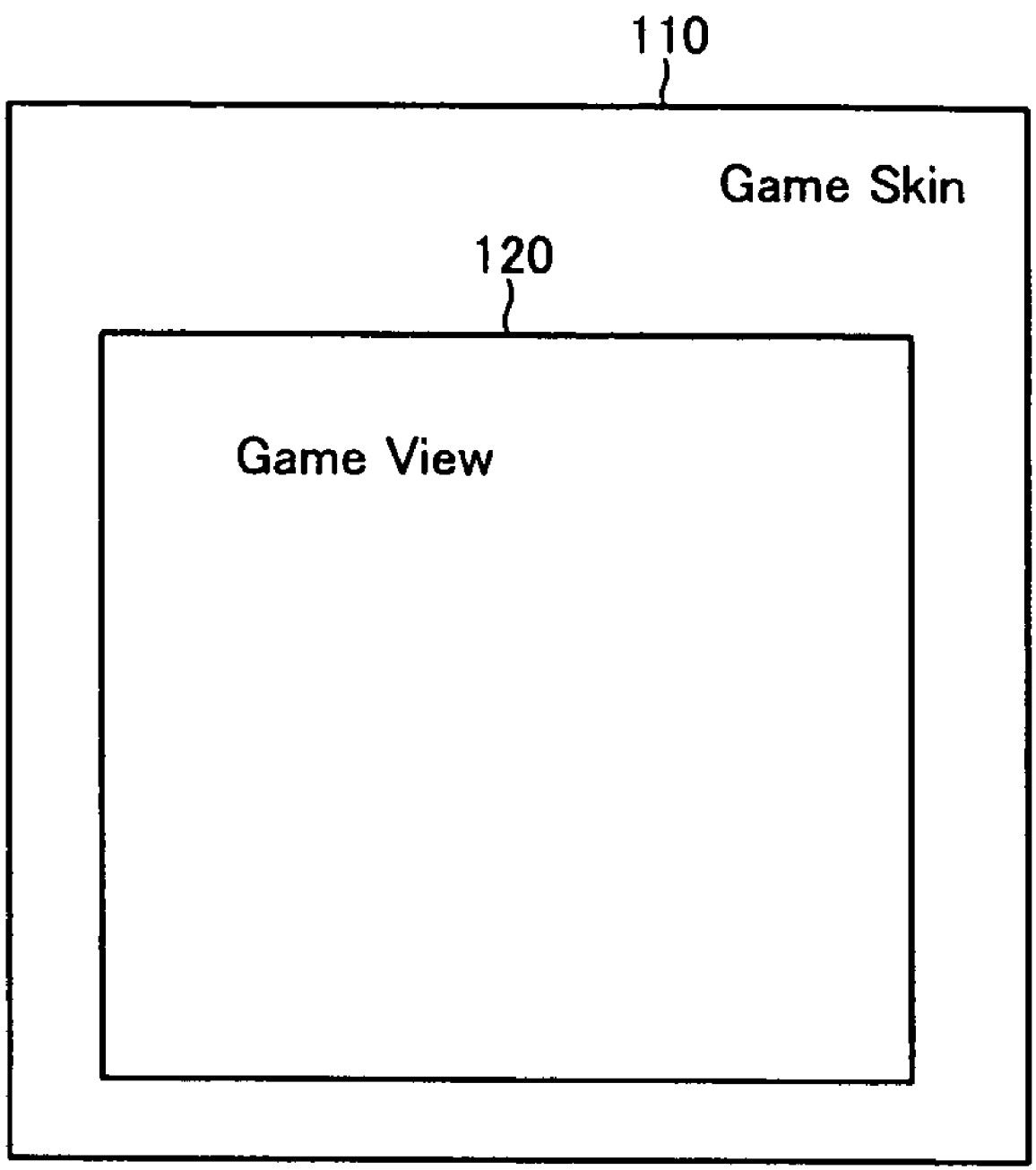
FIG. 3 shows a client screen configuration when a FLASH game is performed by an online FLASH game protection system according to an embodiment of the present invention.

FIG. 3 shows a FLASH game screen configuration displayed on the user terminal screen by a game skin FLASH module and a game view FLASH module.

The FLASH game screen includes a game skin FLASH and a game view FLASH.

The game skin FLASH is initially performed on the user terminal when a FLASH game is performed, and the game skin FLASH can be displayed to include the subsequent game view FLASH in a like manner of a frame.

In this instance, the game skin FLASH can control the game view FLASH to be loaded onto the game skin FLASH in a like manner in which the conventional web browser loads a web page onto the web browser. Also, the game skin FLASH is provided on the user terminal and is performed thereon depending on the game types, and the game skin FLASH module controls the game view FLASH module and it is possible to configure the game skin FLASH in an invisible manner.

The game view FLASH is substantial game contents played by the user, and realizes the performance of a game, that is, the original function of the game. In this instance, the game view FLASH can include a UI FLASH and a game contents FLASH.

The UI FLASH can realize common parts included by other FLASH games (e.g. a game start button, a rank display blank, and an event display blank) or additional functions, and the game contents FLASH can realize the original function of the game.

Figure 4:
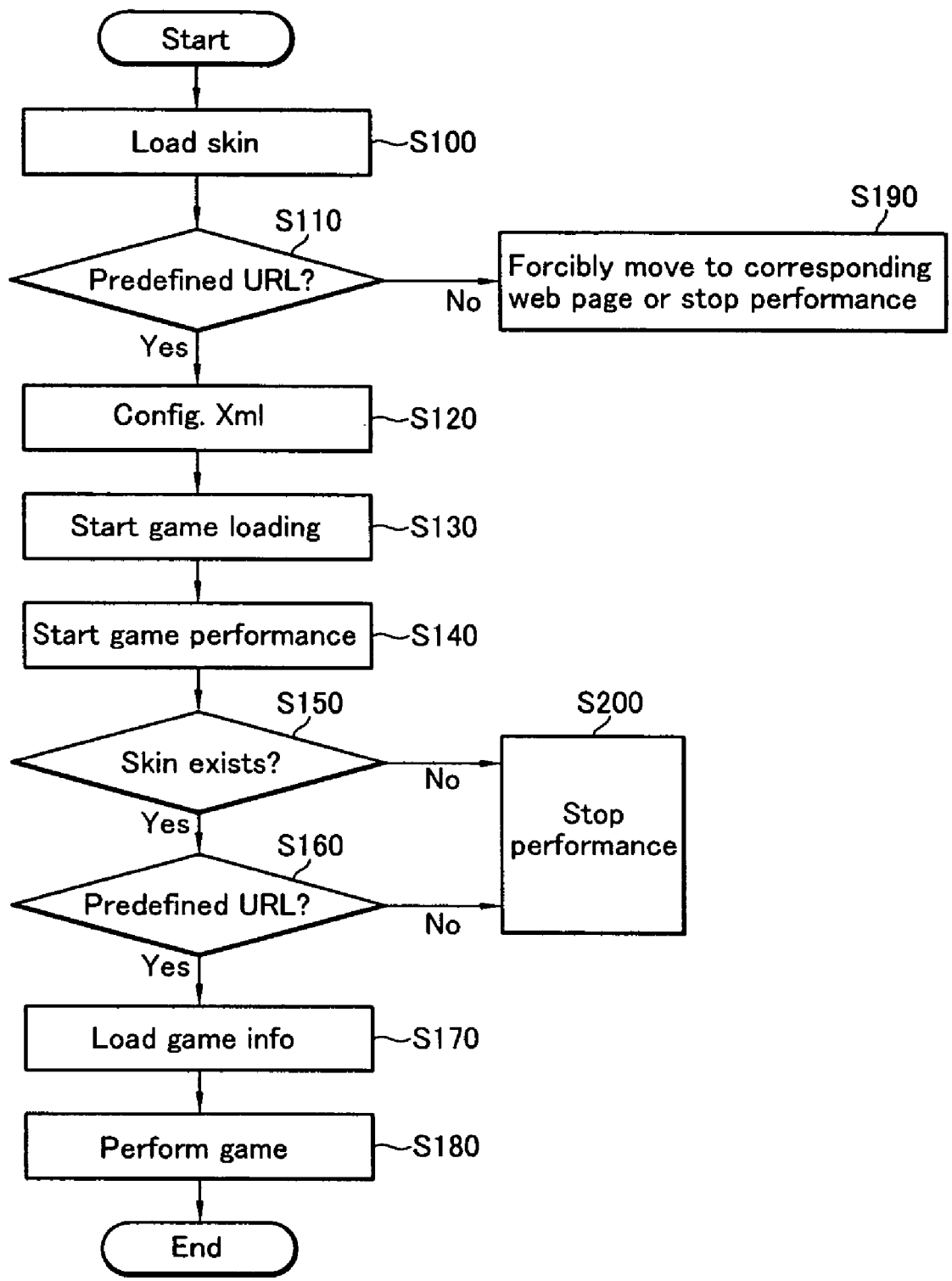
FIG. 4 shows a flowchart for an online FLASH game protection method according to an embodiment of the present invention.

Referring to FIG. 4, an online FLASH game protecting method according to an embodiment of the present invention will now be described.

First, when the user accesses the online FLASH came providing web server through the user terminal to select a specific FLASH game, the game skin FLASH module controls the game skin FLASH to be performed on the screen of the user terminal irrespective of the type of the FLASH game selected by the user (S 100).

In this instance, when the corresponding web page on which the FLASH is performed is not the predefined URL, the game skin FLASH module can forcibly move the user to a predetermined web page. In addition, the game skin FLASH module can terminate game screen loading for FLASH game performance (S 110 and S 190).

Therefore, it is prevented for the unknown user to transfer the corresponding FLASH game including the game skin module and the game view module without permission, and to perform the FLASH game at a changed web page and not at a predefined address.

When the FLASH execution web page is the predetermined URL, the game skin FLASH module checks FLASH game information corresponding to the FLASH game ID selected by the user based on the FLASH game execution information such as CONFIG.XML (S 120).

The game skin FLASH module controls the game view FLASH module so that the game may be loaded on the screen of the user terminal while the substantial game screen of the corresponding FLASH game is displayed (S 130). When the user clicks the game start button displayed on the screen of the user terminal the game starts (S 140).

That is, the game skin FLASH module receives information for performing the corresponding FLASH game including game view FLASH module information from the stored FLASH game execution information. Therefore, transfer the FLASH game without permission is prevented by checking the URL of the FLASH game files shown in the source codes since no user can check UL information of the corresponding FLASH game files by checking the source codes of the web page for providing the FLASH game.

The game view FLASH module checks whether the game skin FLASH is performed by the game skin FLASH module (S 150). The game view FLASH module terminates setting the corresponding web page (S 200) when determining that no game skin FLASH is provided.

Also, the game view FLASH module can terminate setting the corresponding web page for performing the FLASH game when the web page on which the FLASH game is performed is not a predefined web page's URL while there is a game skin module (S 160 and S 200).

Therefore, it is prevented to transfer the game view FLASH for substantially performing the FLASH game.

The game view FLASH module controls game information for substantially performing the FLASH game to be loaded on to the user terminal and performs the game (S 160-S 180) when there is a game skin module and the URL of the web page set for performing the FLASH game corresponds to the predefined URL.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For example, the server configuration of the above-described online FLASH game protection system can be further classified or combined according to functions, and the functions are not restricted according to their titles.

According to the present invention, it is prevented for an undesired user to check the source codes of the web page for providing various online FLASH games and transfer specific FLASH games without permission.

Particularly, protection for the FLASH game provided on the Internet is further reinforced since a single FLASH game is divided into modules depending on the functions, and the modules can crosscheck the URLs of web pages on which the corresponding FLASH game is performed.

What is claimed is:

1. A system for providing and protecting online FLASH games, the system comprising:
    a game view module configured to provide a FLASH game view for realizing game content as a FLASH application on a game screen displayed on a user terminal; and
    a game skin module configured to provide a FLASH game skin-comprising a frame of flash game content, wherein the game skin module is configured to operate in response to, at least in part, selecting performance of a FLASH game through a web server, and configured to control the game view module to perform the FLASH game content by referring to stored FLASH game execution information based at least in part on a game ID of the selected FLASH game, so that the game view FLASH source information is provided from the FLASH game execution information,
    wherein the game skin module is configured to terminate an operation of the FLASH game in response to detection that the FLASH game is performed on a web page of which an address is other than a designated universal resource locator (URL).

2. The system of claim 1, further comprising a web server configured to comprise at least the game skin module, which is configured to operate independent of a selected type of game.

3. The system of claim 1, wherein the flash game execution information comprises at least one of a game name of each FLASH game, a game ID, version information, game view FLASH module information for realizing FLASH game views to configure a FLASH game, corresponding server information, and port information, and wherein the FLASH game execution information is stored in a web server.

4. The system of claim 1, wherein the game skin module configured to move the screen displayed on the user terminal to an intended web page or to terminate realization of the FLASH game skin if a web page on which the FLASH game skin is realized does not have an intended web page URL.

5. The system of claim 1, wherein the game view module is configured to terminate realization of the FLASH game view if a web page on which the FLASH game view is realized does not have an intended web page URL screen.

6. The system of claim 1, wherein the game view module is configured to terminate realization of the FLASH game view if no FLASH game skin is realized by the game skin module in realizing the FLASH game view on the user terminal screen.

* * * * *